United States Patent [19]

Yatka et al.

[11] Patent Number: 5,298,263
[45] Date of Patent: Mar. 29, 1994

[54] CHEWING GUM COATED WITH PALATINOSE OR PALATINOSE OLIGOSACCHARIDE

[75] Inventors: Robert J. Yatka, Orland Park; Lindell C. Richey, Lake Zurich, both of Ill.

[73] Assignee: Wm. Wrigley Jr. Company, Chicago, Ill.

[21] Appl. No.: 969,476

[22] Filed: Oct. 30, 1992

Related U.S. Application Data

[63] Continuation-in-part of PCT/US92/05217, Jun. 19, 1992, published as WO92/2217, which is a continuation-in-part of PCT/US91/04349, published as WO91/15941.

[51] Int. Cl.$^5$ ............................................. A23G 3/30
[52] U.S. Cl. .......................................... 426/5; 426/548; 426/658; 426/804; 426/302
[58] Field of Search ............................... 426/3-6, 426/548, 658, 302, 804

[56] References Cited

U.S. PATENT DOCUMENTS

| | | | |
|---|---|---|---|
| 3,865,957 | 2/1975 | Schieweck et al. | 426/548 |
| 3,912,804 | 10/1975 | Schiweck | 424/9 |
| 4,233,439 | 11/1980 | Schiweck et al. | 426/548 |
| 4,359,531 | 11/1982 | Bucke et al. | 426/658 |
| 4,382,963 | 5/1983 | Klose et al. | 426/3 |
| 4,556,429 | 12/1985 | Takazoe et al. | 426/658 |
| 4,587,119 | 5/1986 | Bucke et al. | 426/3 |
| 4,695,326 | 9/1987 | Takazoe et al. | 426/658 |
| 4,765,991 | 8/1988 | Cherukuri et al. | 426/3 |
| 4,786,722 | 11/1988 | Zehner | 426/658 |
| 4,792,453 | 12/1988 | Reed et al. | 426/5 |
| 4,883,685 | 11/1989 | Kondou | 426/658 |
| 4,908,212 | 3/1990 | Kwon et al. | 426/3 |
| 4,948,616 | 8/1990 | Iijima et al. | 426/658 |
| 4,961,935 | 10/1990 | Cherukuri et al. | 426/3 |
| 4,976,972 | 12/1990 | Patel et al. | 426/3 |
| 4,980,127 | 12/1990 | Parris et al. | 420/418 |
| 4,983,405 | 1/1991 | Cherukuri et al. | 426/3 |
| 4,988,518 | 1/1991 | Patel et al. | 426/5 |
| 5,041,293 | 8/1991 | Patel et al. | 426/3 |
| 5,087,460 | 2/1992 | Cherukuri et al. | 426/5 |
| 5,135,761 | 8/1992 | Dave et al. | 426/5 |

FOREIGN PATENT DOCUMENTS

| | | |
|---|---|---|
| 0325090A2 | 7/1989 | European Pat. Off. |
| 0351972A1 | 1/1990 | European Pat. Off. |
| 0351973A2 | 1/1990 | European Pat. Off. |
| 0390438A1 | 10/1990 | European Pat. Off. |
| 0483755A2 | 5/1992 | European Pat. Off. |
| 57-86246 | 9/1982 | Japan |
| 58-138355 | 8/1983 | Japan |
| 59-173066 | 9/1984 | Japan |
| 8509466 | 1/1985 | Japan |
| 60-248137 | 12/1985 | Japan |
| 62-148496 | 7/1987 | Japan |
| 89-19860 | 4/1989 | Japan |
| 3-39100 | 2/1991 | Japan |
| 3-240463 | 10/1991 | Japan |
| 3-312595 | 11/1992 | Japan |
| 3-316455 | 11/1992 | Japan |
| WO90/06317 | 6/1990 | PCT Int'l Appl. |
| WO91/15941 | 10/1991 | PCT Int'l Appl. |
| WO92/22217 | 12/1992 | PCT Int'l Appl. |
| 2063268A | 6/1981 | United Kingdom |
| 2066639A | 7/1981 | United Kingdom |
| 2223944A | 4/1990 | United Kingdom |

OTHER PUBLICATIONS

Chapter 6, Palatinose—An Isomeric Alternative to Sucrose, by Ichiro Takazoe, from a book entitled *Progress in Sweeteners*, edited by T. H. Grenby, 1989, pp. 143–167.

"Coloration and Other Chemical Changes in the Manufacture of Palatinose Candy," by Yoshikazu Nakajima and Takeo Mizutani, translated from the *Journal of the Society for Research into Sugar Refining Techniques*, No. 36, pp. 95–103 (1988).

"Production and Properties of Palatinose-Oligosaccharide," by Kazui Ogasa, Akio Masubuchi, Takeo Mizutani, Yoshikazu Nakajima and Koji Nishio, translated from the *Journal of the Society for Research into Sugar Refining Techniques*, No. 37, pp. 85–91 (1989).

"Properties and Use of Palatinose-Oligosaccharide," by Takeo Mizutani, translated from *New Food Industry*, vol. 33, No. 2 (1991).

"Production and Applications of Palatinose-Oligosaccharide," by Takeo Mizutani, Mitsui Sugar Co., Ltd., translated from Gekkan Fudo Kemikaru, Oct. 1989, pp. 67–72.

*Primary Examiner*—Jeanette Hunter
*Attorney, Agent, or Firm*—Willian Brinks Hofer Gilson & Lione

[57] ABSTRACT

Chewing gum products containing palatinose and/or palatinose oligosaccharide and methods of making such gum products are disclosed. In one embodiment, the palatinose and/or palatinose oligosaccharide are used in a coating, such as a hard-shell coating, for a pellet gum.

19 Claims, No Drawings

CHEWING GUM COATED WITH PALATINOSE OR PALATINOSE OLIGOSACCHARIDE

CROSS REFERENCE TO RELATED APPLICATIONS

The present application is a continuation-in-part of application Ser. No. PCT/US92/05217, filed Jun. 19, 1992, published as WO 92/22217 which in turn is a continuation-in-part of application Ser. No. PCT/US91/04349, filed on Jun. 19, 1991, published as WO 91/15941. Both of these applications are incorporated herein by reference.

BACKGROUND OF THE INVENTION

The present invention relates to improved chewing gum products. More particularly, the present invention relates to improving chewing gum products by the use of specific bulking agents in a coating applied to the gum products.

Chewing gums are frequently enclosed with hard or soft coatings. Coatings provide an opportunity for the manufacturer to vary product characteristics such as taste, appearance and nutritional value. In recent years, efforts have been devoted to producing sugarless hard coatings for chewing gum. In today's health conscious society, gums containing sugarless sweeteners are popular confectionary items. In response to this consumer demand, the industry has investigated sugarless coatings containing compounds such as xylitol, sorbitol, mannitol, hydrogenated isomaltulose and hydrogenated starch hydrolyzates. These sugarless compounds contain sweetening characteristics but are devoid of commonly known sugars such as sucrose, dextrose, fructose, glucose and equivalent products.

Hard coatings containing sorbitol are common in the art. Sorbitol is generally acceptable because of its availability and the low cost. Sugarless gums coated with sorbitol, however, suffer from deficiencies. For example, sorbitol coating solutions are difficult to employ in the coating process. In addition, sorbitol coated products are usually rough, contain colored spots or blotches, and are waxy. Furthermore, because of its hygroscopicity, sorbitol dries and crystallizes slowly. Thus, sorbitol coated products are often rejected by consumers because of their rough and mottled appearance and lack of crunchiness as compared to sugar coatings.

Accordingly, a need currently exists in the confectionary market place for a gum with a hard coating which possesses the appealable characteristics of a sugar coating. To satisfy consumers, the coating would ideally be identical in appearance, taste, and mouth feel to a sugar coating. To satisfy the manufacturers, the coating would be high in stability, easy to apply and economical.

The non-sugar polyols such as sorbitol, mannitol, xylitol and hydrogenated isomaltulose have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for a coated chewing gum that would act as a coating, but not contribute to dental caries nor cause gastrointestinal disturbances.

One such material is called palatinose (or isomaltulose). This bulking agent or bulk sweetener, which is not approved for use in food products or in chewing gum in the U.S., is being considered by the US-FDA for GRAS Affirmation. The bulk sweetener is approved for use in Japan and is being used in chewing gum. Although a sugar, palatinose does not contribute to dental caries, nor does it cause gastrointestinal disturbances. Palatinose has also been polymerized to yield another similar bulking agent ingredient, called palatinose oligosaccharide (POS).

The manufacture of palatinose is disclosed in UK Patent No. 2 063 268, U.S. Pat. No. 4,359,531, and EPO Patent Publication No. 0 483 755.

U.S. Pat. No. 4,587,119 and UK Patent No. 2 066 639 disclose the replacement of sucrose with palatinose in various food type products, including chewing gum.

Combinations of palatinose with high-potency sweeteners are disclosed in EPO Patent Publication No. 0 390 438 (using sucralose) and Japanese Patent Disclosures Nos. 83-138355 (using aspartame) and 1991-240463.

Results of cariogenic studies of palatinose are disclosed in U.S. Pat. Nos. 4,556,429 and 4,695,326. Palatinose inhibits the formation of insoluble glucan from sucrose and thus reduces dental plaque.

The use of palatinose in chewing gum is disclosed in U.S. Pat. No. 4,976,972, UK Patent No. 2 223 944 and Japanese Patent Publications Nos. 82-86246, 85-248137, 89-19860, 1991-240463 and 1991-39100.

Hydrogenated isomaltulose is disclosed in U.S. Pat. Nos. 3,865,957 and 4,233,439 and in Japanese Patent Publication No. 87-148496. Chewing gums using hydrogenated isomaltulose are disclosed in U.S. Pat. Nos. 4,792,435 and 4,961,935.

An oligosacchaaride syrup containing palatinose is disclosed in Japanese Patent Publication No. 85-09466.

More information on palatinose can be found in *Progress in Sweeteners*, edited by T. H. Grenby, published by Elsevier Science Publishers Ltd., England in 1989, Chapter 6, pages 143–167.

SUMMARY OF THE INVENTION

Chewing gum products covered with a coating containing palatinose and/or palatinose oligosaccharide and methods of making such gum products have been invented. The palatinose and/or palatinose oligosaccharide are used in the coating, such as a hard-shell coating, for a pellet gum. The gum pellet may also be sweetened with palatinose or palatinose oligosaccharide. Even through palatinose and palatinose oligosaccharide are very similar to sucrose, they are not cariogenic, nor do they cause gastrointestinal disturbances, giving a highly consumer-acceptable chewing gum product.

DETAILED DESCRIPTION OF THE PREFERRED EMBODIMENTS

As used herein, the term "chewing gum" also includes bubble gum and the like. Unless otherwise specified, all percentages used herein are weight percents.

Palatinose is a carbohydrate bulking agent that is similar to sucrose, but low in sweetness intensity. Although palatinose is an isomer of sucrose, its sweetness intensity is only 42% of sucrose. Palatinose, also known as isomaltulose, is a crystalline reducing disaccharide with an α-1,6 bond between glucose and fructose. The chemical name for palatinose is 6-0-α-D glucopyranosyl-D-fructose.

Palatinose crystallizes with one water molecule per palatinose molecule, but the dehydrated form is not crystalline. Including water of crystallization, the molecular weight is 360. The melting point is 122°-123° C., which is much lower than sucrose at 182° C.

The United States Food and Drug Administration is now considering palatinose under a GRAS Affirmation petition. In Japan, palatinose is considered a food item. Palatinose is being marketed in the United States by Mitsui Sugar Co., Inc. of Tokyo, Japan. It is also available from Palatinit Sussungsmittel GmbH through its U.S. representative in Elkhart, Ind.

Palatinose is available as a crystalline material that is 99% pure with its water of crystallization. In a variety of cariogenicity test, pure palatinose has been found to be non-cariogenic. Palatinose is also available as a palatinose syrup composed of palatinose, trehalulose and other carbohydrates. This syrup, however, is considered low-cariogenic. POS is considered similar to palatinose in that it is non-cariogenic. Any of these three forms of palatinose may be used in a chewing gum coating, as well as in a chewing gum center.

Commercially available POS, on a dry solids basis, is 48% palatinose and 50% oligosaccharides made by palatinose repolymerization with citric acid. It contains less than 5% moisture and has unique physical properties in that it is very hygroscopic, has low sweetness, has high water solubility, and is very thermostable.

Palatinose may be added to a chewing gum center in its crystalline/solid form or dissolved in water. Its solubility in water is about 30% at room temperature, but increases with increased temperature to about 75% at 100° C. Palatinose may be used in a chewing gum center as a texture and flavor modifier, bulking agent, and may improve texture, flavor, and shelf-life properties. Palatinose may replace solids like sucrose, dextrose or lactose when used in its powder form, or may replace syrups when used in its liquid or syrup form. At levels of about 0.5% to about 25%, palatinose or POS may replace part of the solids in sugar gum or, as a liquid, all or part of the syrup in sugar gum. At higher levels of about 25% to about 90% of the gum formulation, palatinose and/or POS may replace all of the solids in a chewing gum formulation.

Although palatinose and POS are similar to sucrose and glucose polymers, their unique anti-caries properties suggest that they may be used in chewing gum formulations containing non-sugar ingredients. Non-sugar ingredients are alditols such as sorbitol, mannitol, xylitol, lactitol, hydrogenated isomaltulose, maltitol and hydrogenated starch hydrolyzates. These alditols are used in a variety of combinations to develop unique sugarless chewing gum formulations. Palatinose and POS may be used to replace the individual alditols or combinations of alditols. With partial replacement of one or more alditols, palatinose or POS can be used at levels of about 0.5-25%. If palatinose and POS replace a large amount or most of the alditols, this level may be about 25% to about 90% of the gum formulation.

POS may act as an encapsulating or agglomerating agent. POS may also be used to absorb other ingredients. POS may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with POS may improve the sweetener's shelf-life.

POS may be used with other bulk sweeteners and in combination give unique properties. POS may be co-dried by various delayed release methods with other bulk sweeteners like sucrose, dextrose, lactose, maltose, fructose, corn syrup solids, sorbitol, mannitol, xylitol, maltitol, hydrogenated isomaltulose and hydrogenated starch hydrolyzates for use in sugar and sugar-free chewing gum. Ingredients, including flavors, co-dried, encapsulated, agglomerated or absorbed on POS, may show faster release. However, encapsulation of flavors with POS may improve the shelf-life of the flavor ingredient.

The present invention employs palatinose or POS sweetener in the coating/panning of a pellet chewing gum. Pellet or ball gum is prepared as conventional chewing gum, but formed into pellets that are pillow shaped or into balls. The pellets/balls can then be coated or panned by conventional panning techniques to make a unique coated pellet gum.

Conventional panning procedures generally apply a liquid coating to a pellet, which is then solidified, usually by drying the coating. The coating layer is built up by successive coating and drying steps.

Palatinose and POS are very stable and highly water soluble, and can be easily added to a sugar solution prepared for sugar panning. Palatinose may be used alone in solution as the coating on pellet gum to give a non-cariogenic sugar type coating. POS may also be added as a liquid form to the palatinose coating or any other sugar or alditol coating. Palatinose or POS can also be added as a powder blended with other powders often used in some types of conventional panning procedures. Using palatinose or POS sweetener isolates it from other gum ingredients and modifies its release rate in chewing gum. Generally, palatinose will comprise greater than 50% of the coating, and preferably greater than 90% of the coating. POS may be used at levels of about 1% to about 20% in the coating and about 0.5% to about 10% of the weight of the chewing gum product. The weight of the coating may be about 10% to about 75%, and preferably 20% to about 50%, of the weight of the finished gum product.

Conventional panning procedures, as well as some recent advances in panning, have allowed the use of carbohydrate materials like palatinose to be used in the place of sucrose. Other components that may be added to a palatinose coating include, but are not limited to, xylitol, lactitol, hydrogenated isomaltulose and other non-cariogenic alditols, or a combination thereof. These materials may be blended with panning modifiers including, but not limited to, gum arabic, gelatin, cellulose derivatives like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Antitack agents may also be added as panning modifiers, which allow palatinose and POS to be used in the development of new panned or coated gum products. Flavors may also be added with the palatinose coating to yield unique product characteristics.

Crystalline or powdered palatinose is 99% pure and may be used alone to coat chewing gum pellets. It may be combined with panning modifiers to strengthen the resulting hard shell or used with antitack agents to reduce sticking. Panning tests have shown crystalline palatinose obtained from Mitsui Sugar Co. of Japan is slightly tacky for coating. There are two possible reasons for this. First, other saccharide impurities may cause palatinose to be tacky, and slow its crystallization during coating. If this were the reason, a more pure palatinose would be easy to use to make a coated pellet gum. Secondly, upon being dried from an aqueous solution, as previously noted, palatinose forms a monohydrate. Thus, during the coating operation, the palatinose may dry to a monohydrate initially, then release its moisture later This is easily overcome by not allowing previous coatings to completely dry between applications of liquid palatinose syrup. After the final coatings are applied, further drying is done by holding pellets in open containers to allow complete crystallization and formation of a hard shell. This is very similar to procedures used for dextrose panning.

Another method to improve coating processes using palatinose is to add a powder coating after a liquid coating. The powder coating may include palatinose, POS, gelatin, cellulose derivatives, starches, modified starches, vegetable gums, and fillers like talc and calcium carbonate. This will reduce stickiness and allow a faster build-up of coating.

POS may be used in combination with powdered palatinose in a liquid syrup to coat pellet gum. POS may also be used as a panning modifier with other sugar and sugar alcohol syrups such as dextrose, sucrose, xylitol and hydrogenated isomaltulose. POS may act as a binder to, and film former for, the sugar or sugar alcohol coating.

The previously described palatinose or POS bulk sweetener may readily be incorporated into a chewing gum center composition. The remainder of the chewing gum ingredients are noncritical to the present invention. That is, the bulk sweetener can be incorporated into conventional chewing gum center formulations in a conventional manner. The palatinose or POS bulk sweeteners may be used in a sugar-free or non-cariogenic chewing gum center. The bulk sweetener may be used in either regular chewing gum or bubble gum centers.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5% to about 95% of the gum. More preferably the insoluble gum base comprises between 10% and 50% of the gum and most preferably about 20% to about 35% of the gum.

The gum base typically also includes a filler component. The filler component may be calcium carbonate, magnesium carbonate, talc, dicalcium phosphate or the like. The filler may constitute between about 5% and about 60% of the gum base. Preferably, the filler comprises about 5% to about 50% of the gum base.

Gum bases typically also contain softeners, including glycerol monostearate and glycerol triacetate. Further, gum bases may also contain optional ingredients such as antioxidants, colors and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5% to about 15.0% of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the palatinose or POS bulk sweetener of the present invention will most likely be used in sugarfree or non-cariogenic formulations. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination. Other non-cariogenic bulking agents may also be used. These include polydextrose, fructooligosaccharide (FOS), oligofructose, indigestible dextrins, and modified non-carogenic materials.

Depending on the particular sweetness release profile and shelf-stability needed, the palatinose or POS solid/-syrup bulk sweeteners of the present invention can also be used in combination with coated or uncoated high-potency sweeteners or with high-potency sweeteners coated with other materials and by other techniques.

A flavoring agent may be present in the chewing gum in an amount within the range of from about 0.1% to about 10.0%, and preferably from about 0.5% to about 3.0%, of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

The present invention contemplates a coating comprising palatinose, preferably between about 50% to about 100%. More preferably, the coating will contain greater than about 90% palatinose. Palatinose is believed to be a superior sweetener in a gum hard coating because of its relatively high sweetening power, lack of aftertaste and synergistic capabilities when mixed with non-sugar alcohols such as xylitol or sorbitol.

The coating may also contain other components such as flavoring agents, artificial sweeteners and dispersing agents, coloring agents, film formers, and binding agents. Flavoring agents contemplated by the present invention include those commonly known in the art and already discussed herein. The flavoring agents may be added to the coating syrup in an amount such that the coating will contain about 0.2% to about 1.2%, and preferably about 0.7% to about 1.0%, flavoring agent.

Artificial sweeteners contemplated by the present invention include those substances already mentioned herein including but not limited to synthetic substances, saccharin, thaumatin, sucralose, alitame, saccharin salts, aspartame and acesulfame-K. The artificial sweetener may be added to the coating syrup in an amount such that the coating will contain about 0.01% to about 0.5%, and preferably about 0.02% to about 0.3%, artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain between about 0.1% to about 1.0%, and preferably about 0.3% to about 0.6%, of the agent.

Coloring agents are preferably added directly to the syrup in the dye or lake form. Coloring agents contemplated by the present invention include food quality dyes. Film formers preferably added to the syrup, include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include alginate, cellulosics, vegetable gums and the like.

In general, the hard coating process is carried out in a rotating pan. Gum center pellets to be coated are placed into the rotating pan to form a moving mass. The material or syrup which will eventually form the hard coating is applied or distributed over the gum center pellets. Flavoring agents may be added before, during and after applying the syrup to the gum centers. Once the coating has dried to a hard surface, additional syrup additions may be made to produce a plurality of coatings or multiple layers of hard coating.

In the hard coating panning procedure, syrup is added to the gum center pellets at a temperature in the range of about 100° F. to about 220° F. Preferably, the syrup temperature is between about 150° F. and to out 200° F. throughout the process in order to prevent the palatinose in the syrup from crystallizing. The syrup may be mixed with, sprayed upon, poured over, or added to the gum center pellets in any way known to those skilled in the art.

The gum center pellets may be coated with a single hard layer or a plurality of hard layers. In general, a plurality of layers is obtained by applying single coats, allowing the layers to dry, and then repeating the process. Any number of coats may be applied to the gum center pellets. Preferably, no more than about 75 coats are applied to the gum center pellets. More preferably, less than about 60 coats are applied and most preferably, between about 30 to about 60 coats are applied. In any event, the present invention contemplates applying an amount of syrup sufficient to yield a hard coated chewing gum product containing about 10 to about 75% coating. Preferably, the final product will contain between about 20% and about 50% coating.

Those skilled in the art will recognize that in order to obtain a plurality of hard coated layers, a plurality of premeasured aliquots of coating syrup may be applied to the gum center pellets. It is contemplated, however, that the volume of aliquots of syrup applied to the gum center pellets may vary throughout the coating procedure.

The present invention contemplates that the syrup preferably comprises between about 30% palatinose solids and its saturation point at coating temperatures. More preferably, the syrup will contain about 60% to about 75% palatinose solids. The syrup may comprise palatinose dissolved in water or any other food quality solvent in an amount sufficient to yield a hard coating comprising between about 50% to about 100% palatinose. More preferably, however, the syrup will comprise an amount of palatinose sufficient to yield a hard coating comprising greater than about 90% palatinose. Furthermore, the syrup and thus the coating may contain sugar substitutes other than palatinose such as sorbitol, mannitol and xylitol.

In addition, it is contemplated by the present invention that a flavoring agent may be added to the syrup, or applied to the gum center pellets while the syrup coating is drying or after the coating has dried. Furthermore, the flavoring agent may be applied after any sequence of coats, for example, the third, twelfth, eighteenth, etc. coat.

Once a coating of syrup is applied to the gum center pellets, the present invention contemplates drying the wet syrup in an inert medium. A preferred drying medium comprises air. Preferably, forced drying air contacts the wet syrup coating in a temperature range of about 80° to about 115° F. More preferably, the drying air is in the temperature range of about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate of about 2800 cubic feet per minute. Furthermore, if a flavoring agent is applied after a syrup coating has been dried, the present invention contemplates drying the flavoring agent with or without the addition of a drying medium.

The following examples are not to be construed as a limitation upon the present invention, but are included merely as an illustration of embodiments of the present invention.

EXAMPLE 1

The following sugar gum center formulation was made:

| | % |
|---|---|
| Base | 24.8 |
| Sugar | 52.0 |
| Corn Syrup | 22.4 |
| Peppermint Flavor | 0.8 |

This formulation was made in a 25 gallon standard gum mixer and sheeted as rectangular pellets for coating tests.

Two starch solutions were prepared using 1?% starch in an aqueous solution. In the first solution, Amylotex brand starch was used. Tex-O-Film brand starch was used in the second solution. Both starches are available from National Starch Co. and both are modified starches, with Tex-O-Film being a thin boiling starch. A coating syrup was prepared by mixing 1,000 grams of a 75% palatinose solution, heated until the palatinose dissolved, 120 grams of the 10% Amylotex solution and 120 grams of the 10% Tex-O-Film solution.

This syrup was used to coat 1000 grams of the above sugar pellets. The first two coats each used about 15 grams of coating syrup. These two coats made the gum very sticky. After each of the next 3-7 coats, about 4 grams of powdered palatinose was applied to dry each coat and reduce sticking. After this, coating with palatinose solution was similar to coating with a 75% sugar solution. Additional syrup coatings were added until the coating reached about 35% of the total product weight.

The final coated product had a hard, crunchy shell, very similar to a sucrose-type hard shell. The appearance was slightly grayer and slightly rougher. The flavor had a creamy character, but was much less sweet than a comparable sugar coating.

EXAMPLES 2-12

The chewing gum formulations shown in Table I discloses various formulas with palatinose powder, palatinose syrup and POS. These formulations may be made as non- or low- cariogenic gum and may be used as centers for palatinose hard coated chewing gum. Chewing gum formulations with palatinose powder and POS are non-cariogenic, whereas those with palatinose syrup are low cariogenic. Pellets may be coated by the procedure described in Example 1 to give formulations with good non-cariogenic properties. These formulations may also contain other high intensity, artificial sweeteners, from 0.02% to about 0.1% for sweeteners like alitame, thaumatin and dihydrochalcones, and from about 0.1% to about 0.3% for sweeteners like sucralose, acesulfame and saccharin.

TABLE I

| | EX. 2 | EX. 3 | EX. 4 | EX. 5 | EX. 6 | EX. 7 | EX. 8 | EX. 9 | EX. 10 | EX. 11 | EX. 12 |
|---|---|---|---|---|---|---|---|---|---|---|---|
| GUM BASE | 19.2 | 25.5 | 25.5 | 25.5 | 40.0 | 25.5 | 25.5 | 25.5 | 25.5 | 50.0 | 70.0 |
| GLYCERIN | 1.7 | 1.7 | 6.7 | 6.7 | 1.7 | 1.7 | 1.7 | 6.7 | 14.7 | 1.6 | 0.6 |
| PALATINOSE POWDER | 57.8 | 46.0 | 41.0 | 41.0 | 35.5 | 51.0 | 61.0 | 26.0 | 28.0 | 35.5 | 20.0 |
| PALATINOSE SYRUP* | 10.0 | 20.0 | 5.0 | — | 10.0 | 20.0 | 10.0 | 20.0 | — | 10.0 | 4.0 |
| POS | 10.0 | 5.0 | 20.0 | 25.0 | 10.0 | — | — | 20.0 | 30.0 | — | 2.0 |
| FLAVOR | 1.0 | 1.5 | 1.5 | 1.5 | 2.5 | 1.5 | 1.5 | 1.5 | 1.5 | 2.5 | 3.0 |
| APM | 0.3 | 0.3 | 0.3 | 0.3 | 0.3 | 0.3 | 0.3 | 0.3 | 0.3 | 0.4 | 0.4 |

*Palatinose syrup may be preblended with glycerin and coevaporated to reduce moisture.

EXAMPLES 13-17

The chewing gum formulations shown in Table II have formulas with various levels of palatinose powder added to other sugarfree, non-cariogenic formulations that include sorbitol, mannitol and Lycasin brand hydrogenated starch hydrolyzates (HSH).

TABLE II

| | EX. 13 | EX. 14 | EX. 15 | EX. 16 | EX. 17 |
|---|---|---|---|---|---|
| GUM BASE | 25.5 | 25.5 | 25.5 | 25.5 | 25.5 |
| SORBITOL | 48.5 | 41.0 | 26.0 | 0.0 | 0.0 |
| MANNITOL | 8.0 | 8.0 | 8.0 | 9.0 | 0.0 |
| COEVAPORATED LYCASIN/GLYCERIN* | 13.1 | 13.1 | 13.1 | 13.1 | 13.1 |
| GLYCERIN | 0.9 | 0.9 | 0.9 | 0.9 | 0.9 |
| PEPPERMINT FLAVOR | 1.5 | 1.5 | 1.5 | 1.5 | 1.5 |
| PALATINOSE | 2.5 | 10.0 | 25.0 | 50.0 | 59.0 |

*Coevaporated to contain 25% glycerin, 67.5% HSH solids and 7.5% moisture.

These gum formulations may be pelletized to form gum centers and coated by the procedure described in Example 1 to give formulations with good non-cariogenic properties.

EXAMPLES 18-21

The following chewing gum formulations were made and pelletized. These contain liquid sorbitol and high and low levels of glycerin with various levels of palatinose.

TABLE III

| | EX. 18 | EX. 19 | EX. 20 | EX. 21* |
|---|---|---|---|---|
| GUM BASE | 27.0 | 27.0 | 27.0 | 30.0* |
| SORBITOL | 40.0 | 25.0 | 8.5 | — |
| LIQUID SORBITOL | 12.7 | 12.7 | 12.7 | — |

TABLE III-continued

|  | EX. 18 | EX. 19 | EX. 20 | EX. 21* |
|---|---|---|---|---|
| GLYCERIN | 8.5 | 8.5 | 0.0 | 4.0 |
| PEPPERMINT FLAVOR | 1.5 | 1.5 | 1.5 | 1.0* |
| APM | 0.3 | 0.3 | 0.3 | — |
| PALATINOSE | 10.0 | 25.0 | 50.0 | 65.0 |

*Example 21 used bubble gum base and spearmint flavor.

As the level of palatinose in the center formulas increased from 10% to 25%, the gum became softer to pelletize, so Example 20 was made without glycerin to obtain a more acceptable product. Example 21 demonstrate that a gum center can be made with just base, glycerin, flavor and palatinose. These center formulations can be coated with palatinose as described in Example 1.

EXAMPLES 22-29

The following gum formulations shown in Table IV demonstrate how palatinose may be combined with other non-cariogenic bulking agents to give centers which may be coated with palatinose to give non-cariogenic gum products.

TABLE IV

|  | EX. 22 | EX. 23 | EX. 24 | EX. 25 | EX. 26 | EX. 27 | EX. 28 | EX. 29 |
|---|---|---|---|---|---|---|---|---|
| GUM BASE | 30.0 | 30.0 | 30.0 | 30.0 | 30.0 | 30.0 | 30.0 | 30.0 |
| GLYCERIN | 1.2 | 9.0 | 1.2 | 9.0 | 1.2 | 9.0 | 1.2 | 9.0 |
| PEPPERMINT FLAVOR | 1.5 | 1.5 | 1.5 | 1.5 | 1.5 | 1.5 | 1.5 | 1.5 |
| APM | 0.3 | 0.4 | 0.3 | 0.4 | 0.3 | 0.4 | 0.3 | 0.4 |
| COEVAPORATED LYCASIN/ GLYCERIN | 12.0 | 4.1 | 12.0 | 4.1 | 12.0 | 4.1 | 12.0 | 4.1 |
| INDIGESTIBLE DEXTRIN* | 10 | 40 | — | — | — | — | — | — |
| POLYDEXTROSE | — | — | 10 | 40 | — | — | — | — |
| NUTRA FLORA** | — | — | — | — | 10 | 40 | — | — |
| FOS*** | — | — | — | — | — | — | 10 | 40 |
| PALATINOSE | 45.0 | 15.0 | 45.0 | 15.0 | 45.0 | 15.0 | 45.0 | 15.0 |

*Fibersol brand indigestible dextrin.
**Nutra Flora brand fructooligosaccharide.
***Ruftilose brand fructooligosaccharide.

These gum formulations can be pelletized to form gum centers and coated by the procedure in Example 1 to give a gum product with good non-cariogenic properties.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A coated chewing gum product comprising a gum pellet coated with a coating comprising palatinose, palatinose oligosaccharide or mixture thereof.

2. The coated chewing gum product of claim 1 wherein the palatinose, palatinose oligosaccharide or mixture thereof comprises about 1% to about 100% of the coating.

3. The coated chewing gum product of claim 1 wherein the coating comprises a hard shell coating.

4. The coated chewing gum product of claim 1 wherein the gum pellet is sweetened at least in part with palatinose or palatinose oligosaccharide.

5. The coated chewing gum product of claim 1 wherein the gum pellet is non-cariogenic.

6. The coated chewing gum product of claim 1 wherein both the coating and gum pellet are non-cariogenic.

7. A method of making a coated chewing gum product comprising the steps of:
   a) providing a gum pellet,
   b) applying a liquid coating syrup to the surface of the gum pellet, the coating syrup comprising palatinose, palatinose oligosaccharide or mixture thereof, and
   c) solidifying the coating syrup.

8. The method of claim 7 wherein the coating syrup comprises a solution and the step of solidifying the coating comprises drying the solution.

9. The method of claim 7 wherein the coating syrup is applied in successive layers, with each layer of syrup being dried before application of an additional layer.

10. The method of claim 9 wherein a powdered coating is applied after one or more of the syrup layers is applied.

11. The method of claim 10 wherein the powdered coating comprises palatinose, palatinose oligosaccharide, gelatin, a cellulose derivative, starch, modified starch, vegetable gum, filler or mixture thereof.

12. The method of claim 7 wherein the coating syrup further comprises a starch.

13. The method of claim 7 wherein the coating syrup is solidified to form a hard shell coating.

14. The method of claim 7 wherein the coating comprises palatinose at a level of greater than 50% of the coating.

15. The method of claim 7 wherein the coating comprises about 1% to about 20% palatinose oligosaccharide.

16. The method of claim 10 wherein the powdered coating comprises 100% palatinose.

17. The method of claim 7 wherein the gum pellet is sweetened at least in part with palatinose or palatinose oligosaccharide.

18. The method of claim 7 wherein the gum pellet is non-cariogenic.

19. The method of claim 7 wherein both the coating and the gum pellet are non-cariogenic.

* * * * *

UNITED STATES PATENT AND TRADEMARK OFFICE
CERTIFICATE OF CORRECTION

PATENT NO. : 5,298,263
DATED : March 29, 1994
INVENTOR(S) : Robert J. Yatka et al.

It is certified that error appears in the above-indentified patent and that said Letters Patent is hereby corrected as shown below:

In column 2, line 49, delete "through" and substitute --though--.

In column 5, line 9, after "later" insert --,--.
In column 8, line 14, delete "to out" and substitute -- to about --.
In column 9, line 2, delete "possess" and substitute --possesses--.
In column 9, line 45, delete "1? %" and substitute --10%--.
In column 11, lines 13-14, delete "demon-strate" and substitute --demonstrates--.

Signed and Sealed this

Twenty-fifth Day of October, 1994

Attest:

BRUCE LEHMAN

*Attesting Officer*  *Commissioner of Patents and Trademarks*